US012733631B2

(12) United States Patent
Pierce

(10) Patent No.: US 12,733,631 B2
(45) Date of Patent: Sep. 15, 2026

(54) FISHING ROD CARRIER

(71) Applicant: Breo Pierce, Freeport, IL (US)

(72) Inventor: Breo Pierce, Freeport, IL (US)

( * ) Notice: Subject to any disclaimer, the term of this patent is extended or adjusted under 35 U.S.C. 154(b) by 0 days.

(21) Appl. No.: 18/988,059

(22) Filed: Dec. 19, 2024

(65) Prior Publication Data

US 2025/0204507 A1 Jun. 26, 2025

Related U.S. Application Data

(60) Provisional application No. 63/613,584, filed on Dec. 21, 2023.

(51) Int. Cl.
*A01K 97/08* (2006.01)

(52) U.S. Cl.
CPC .................................... *A01K 97/08* (2013.01)

(58) Field of Classification Search
CPC ................................ A01K 97/08; A01K 97/06
USPC ................................ 43/26, 25.2; 206/315.11
See application file for complete search history.

(56) References Cited

U.S. PATENT DOCUMENTS 1,508,204 A * 9/1924 Walker ................ A45C 11/008 D3/274
1,839,758 A * 1/1932 Hasek ...................... A45C 7/02 150/132
2,854,775 A * 10/1958 Kleckley ................ A01K 97/08 206/315.11
3,575,327 A * 4/1971 Harrison ................ A01K 97/08 294/157
3,972,144 A * 8/1976 Geisler .................. A01K 97/08 206/315.11
4,417,612 A * 11/1983 Couture ................. A45C 11/32 383/95
4,530,178 A * 7/1985 Rauscher .............. A01K 97/08 43/26
4,708,243 A * 11/1987 Nailon .................. A01K 97/06 206/315.11
4,726,141 A * 2/1988 McBride ................ A01K 97/08 206/315.11
D309,977 S * 8/1990 Whittier ......................... D3/276
4,970,821 A * 11/1990 Young .................... A01K 97/06 206/315.11
5,009,346 A * 4/1991 Butler ..................... F41A 29/00 206/229
5,327,669 A * 7/1994 Lannan .................. A01K 97/08 206/315.11
5,417,354 A * 5/1995 Jones ..................... A01K 97/08 224/613

(Continued)

*Primary Examiner* — Maria E Graber
(74) *Attorney, Agent, or Firm* — The George Washington University Law School Intellectual Property & Technology Clinic

(57) ABSTRACT

The fishing rod carrier includes a flexible panel with an inside layer, an outside layer, a top edge, a first end portion, and a second end portion. The carrier also has at least one primary pocket supported by the panel with at least one primary pocket opening. The carrier has at least one tapered end opposite the pocket opening. The carrier may have a foam layer in between the inside and outside layers of the primary pockets and panel, and the carrier may also have at least one accessory pocket. Both the primary and accessory pockets may have a closure. Furthermore, the carrier may be secured by at least one binding strap with quick release buckles, and a shoulder strap with a shoulder pad.

20 Claims, 5 Drawing Sheets

(56) References Cited

U.S. PATENT DOCUMENTS

| | | | | |
|---|---|---|---|---|
| 6,250,470 | B1 * | 6/2001 | Mackenzie | A01K 97/08 206/315.11 |
| 6,343,728 | B1 | 2/2002 | Carbone | |
| 6,766,881 | B2 * | 7/2004 | Carty | E06C 7/14 248/210 |
| 6,789,713 | B1 * | 9/2004 | Redzisz | A01K 97/08 206/315.11 |
| 7,455,178 | B2 * | 11/2008 | Miller, Jr. | A45C 13/02 190/125 |
| 9,832,985 | B2 * | 12/2017 | Moore, Jr. | A01K 97/08 |
| 10,034,468 | B1 * | 7/2018 | Pitts | A45F 3/047 |
| 2002/0139036 | A1 * | 10/2002 | Smith | A01K 97/06 43/21.2 |
| 2012/0210678 | A1 * | 8/2012 | Alcouloumre | A61B 17/3217 206/370 |
| 2012/0267365 | A1 * | 10/2012 | Sabounjian | A45C 7/0077 29/401.1 |
| 2015/0257377 | A1 * | 9/2015 | Moore, Jr. | A01K 97/08 43/26 |
| 2016/0286777 | A1 * | 10/2016 | Potempa | A47G 9/0207 |
| 2018/0042208 | A1 * | 2/2018 | Slack | A01K 97/08 |
| 2021/0063112 | A1 * | 3/2021 | Culton | A45C 7/0095 |
| 2023/0045823 | A1 * | 2/2023 | Culton | F41C 33/06 |

* cited by examiner 100
124
133
124
123
121
129
128
120
108
116
115
114
125
126
127
5
5

FISHING ROD CARRIER

BACKGROUND OF THE INVENTION

The present invention generally relates to fishing rod carriers.

The activity of fishing frequently involves a diverse range of fishing gear and accessories. There is a need to maintain the items organized when storing or transporting them. At times, anglers prefer not to disassemble fishing rods from the attached reels when carrying the items. Having a carrier that accommodates fishing rods with attached reels offers the advantage of keeping fishing equipment organized while maintaining the fishing rods attached to their reels. Furthermore, there are many different length fishing rods, and fishermen often use multiple rods with attached reels. Therefore, there is a need for a fishing rod carrier that can accommodate multiple fishing rods of different sizes in tandem with each other.

Several prior art references reveal cases or bags designed for organizing and carrying fishing rods. U.S. Pat. No. 5,327,669 to Lannan et al. discloses a carrying and storage case for fishing rods with attached reels and accessories.

U.S. Pub. No. 2016/0286777A1 to Potempa discloses a soft and durable carrying case for transporting one or more fishing rods (typically a 2-piece rod) and reels. that affords protection as well as buoyancy if dropped in the water. The Potempa invention can be reconfigured into a seat cushion after taking out the rods and reels.

U.S. Pat. No. 6,343,728 to Carbone also discloses a support bag for the enclosure and controlled support of a fishing rod and reel arrangement.

SUMMARY OF THE INVENTION

The present invention generally relates to a fishing rods case, and more particularly, to a carrying device for multiple fishing rods with attached reels and accessories. The carrier, according to one embodiment, includes a panel, a plurality of pockets, and one or more binding straps. The panel is made from a flexible material, in one embodiment, the carrier can be constructed from a durable texture such as nylon. In one embodiment, the carrier can be constructed using a foam layer in between the layers of flexible material.

A plurality of pockets is attached to the panel. The pockets and the pocket openings are sized to allow fishing rods with attached reels to be stored inside the pocket. In one embodiment, the pockets are separated and extend from one end of the panel to the other end, and the opening for each pocket is positioned on alternating ends of the carrier. Moreover, each pocket is equipped with a closure. According to one embodiment, the closure can be a spring-loaded cord clap located at the pocket opening. Additionally, each pocket can have an accessory pocket attached to it.

The carrier also contains one or more straps that allow the carrier to be secured in a rolled-up position, in one embodiment, the straps are attached with quick-release buckles that enable the carrier to be locked in a rolled-up position. The carrier can also contain a carrying handle extending from the carrier's top edge.

BRIEF DESCRIPTION OF THE DRAWINGS

The novel features and advances of the present invention will become more apparent by describing in detail exemplary embodiments with reference to the attached figures in which.

DETAILED DESCRIPTION

Figure 1:
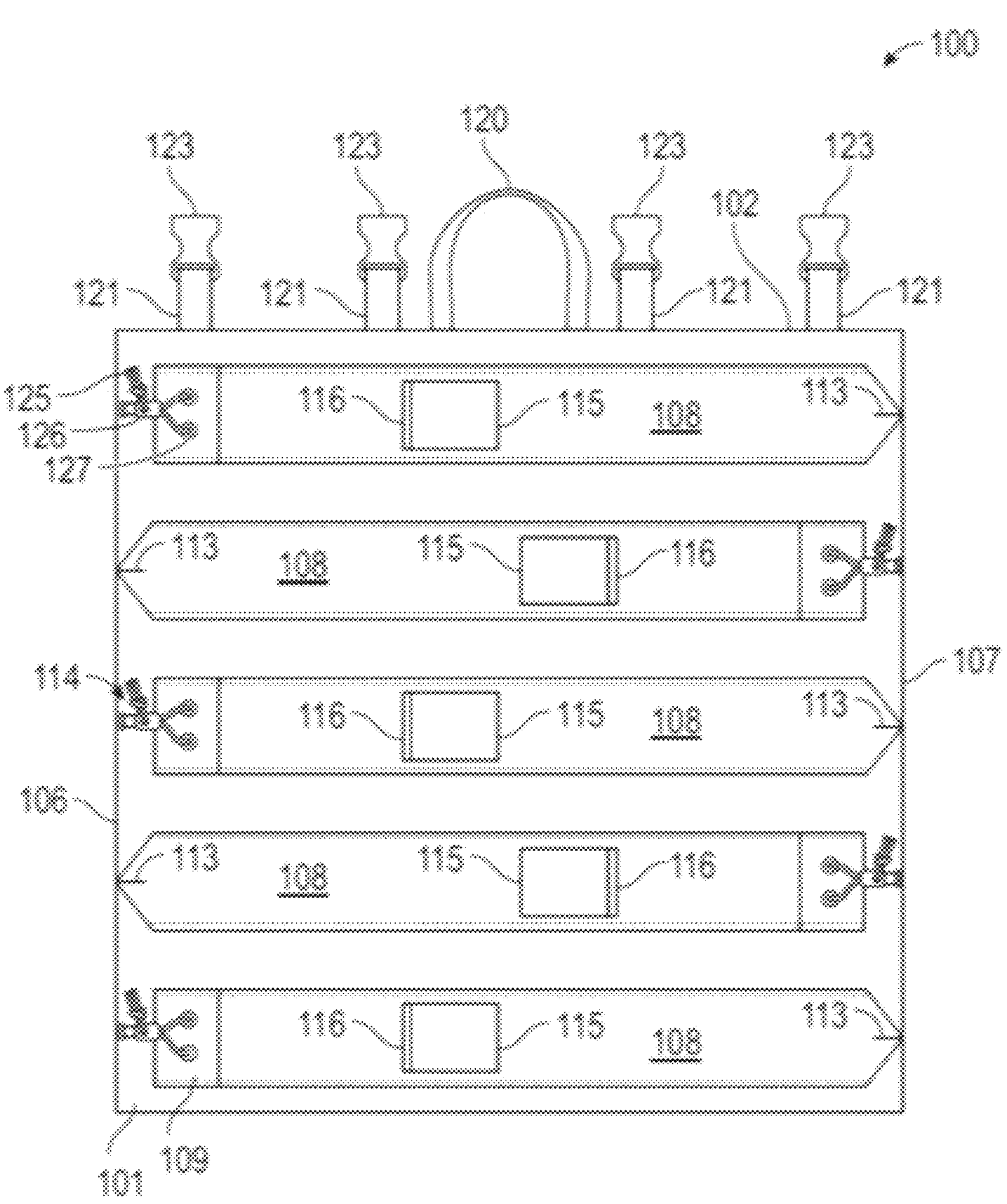
FIG. 1 shows a top view of the inside of the carrier in an unrolled position.

The present invention will now be described with reference to the accompanying figures, in which exemplary embodiments of the invention are shown. The invention may, however, be embodied in many different forms and should not be construed as being limited to the embodiments set forth herein. Rather, these embodiments are provided so that this disclosure will be thorough and complete, and will fully convey the concept of the invention to those skilled in the art.

In the figures, whenever the same element reappears in subsequent figures, it is denoted by the same reference numeral.

Referring to FIG. 1, FIG. 1 shows a carrier 100 according to an embodiment of the present invention. As shown in more detail in FIG. 4, the carrier 100 can be used for transporting and storing fishing rods 124 with or without attached reels 133 and accessories. As best seen in FIG. 1, the carrier 100 includes a panel 101 and a plurality of primary pockets 108. In one embodiment, the panel 101 is made of a flexible material having a rectangular shape when in the unrolled position. Additionally, the panel 101 can be made from durable and/or waterproof fabric. In one embodiment the panel 101 is made from nylon.

Figure 4:
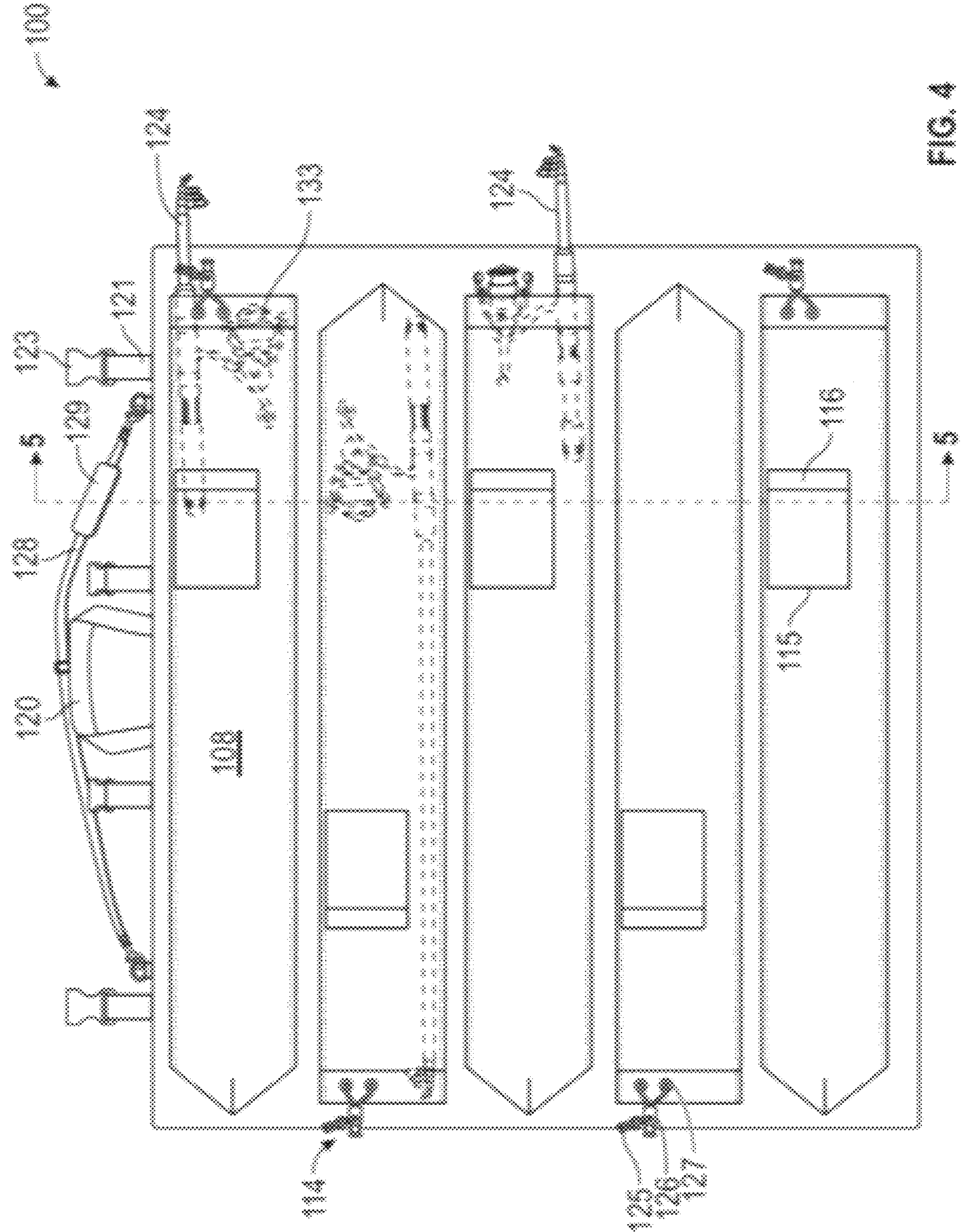
FIG. 4 shows a top view of the inside of the carrier with fishing rods and attached reels.

The panel 101 includes a top edge 102, an inside layer 103, an outside layer 104, a first end portion 106, and a second end portion 107. As best shown in FIG. 4, the panel 101 can be manufactured to a size appropriate for carrying fishing rods 124 of different lengths with attached reels 133. In one embodiment, the panel 101 measures 59" by 59".

Figure 5:
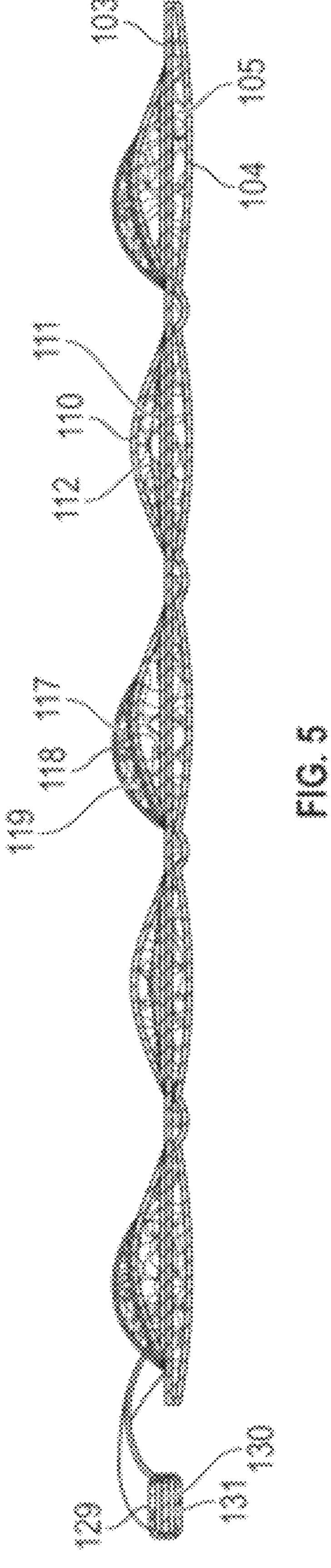
FIG. 5 shows a cross sectional view of the panel, primary pockets, and accessory pockets.

As best seen in FIG. 5, the panel 101 can further include a layer of foam 105 between the inside layer 103 and the outside layer 104, to offer improved protection to the fishing rods 124 with or without attached reels 133 placed inside the carrier 100. The inside layer 103 and outside layer 104 may be sewn together to securely position the foam layer between them. The layers 103 and 104 may also be joined together using other means such as an adhesive, zipper, hook and loop, or other similar fasteners. The foam layer 105 may be made of a material that offers increased water-resistance, such as polyester.

As best seen in FIG. 1, the panel 101 supports a plurality of primary pockets 108. The primary pockets 108 may have an elongated rectangular shape, as best shown in FIG. 1. The primary pockets 108 each define a primary pocket opening 109 at their respective proximal ends and a closed tapered end at its distal end, as best seen in FIG. 1.

As best shown in FIG. 1, the plurality of primary pockets 108 extend between the first end portion 106 of the panel 101 and the second end portion 107. The plurality of primary pockets 108 are attached to or supported by the inside layer 103 of the panel 101. The primary pockets 108 may be affixed to the panel 101 by sewing the inside layer of the primary pockets 108 to the inside layer 103 of the panel. Alternatively, the primary pockets 108 can be separately made and affixed to the inside layer 103 using an attachment method like Velcro®. One of ordinary skill will also appreciate that the primary pockets 108 may be supported by the outside layer 104 using the techniques described for attaching the primary pockets 108 to the inside layer 103.

In one embodiment, the primary pockets 108 have V-shaped tapered ends 113. This V-shape allows multiple rods 124 to fit into each primary pocket 108, as best seen in FIG. 4, so that the rods 124 are less likely to move around within each primary pocket 108. As best seen in FIG. 1, the primary pocket opening 109 for each sequential primary pocket 108 is positioned so that the openings of adjacent primary pockets are located at opposite ends of the panel 101.

As best shown in FIG. 5, in one embodiment, the primary pockets 108 have an outside layer 110 and inside layer 111 made of flexible fabric material. In one embodiment, between the outside layer 110 and the inside layer 111, the primary pockets 108 include a foam layer 112. The inside layer 111 and outside layer 110 may be sewn together to securely position the foam layer 112 between them. The layers 110 and 111 may also be joined together using other means such as an adhesive, zipper, hook and loop, or other similar fasteners. The foam layer 112 may be made of a material that offers increased water-resistance, such as polyester.

As best seen in FIG. 1, when supported by or attached to the inside layer 103, each primary pocket 108 opens outwardly from the inside layer 103 of the panel 101. As best shown in FIG. 4, when in use, a fishing rod 124 with or without attached reels 133 can be inserted into the primary pockets 108 through the primary pocket opening 109. In one embodiment, each primary pocket 108 is positioned separately from the other pockets 108, maintaining a distance of approximately 2" between the pockets 108. The primary pocket 108 may be manufactured to a size appropriate for carrying fishing rods 124 of different lengths. In one embodiment, each primary pocket 108 is 55.75" in length and 8.95" in width.

Referring to FIG. 1, FIG. 1 shows a closure 114 associated with each primary pocket opening 109. When in use, the closure 114 can close the primary pocket opening 109 to keep the fishing rods 124 secured inside the primary pocket 108. According to one embodiment as shown in FIG. 1, the closure mechanism 114 can be a spring-loaded cord clap. Further, the embodiment shown in FIG. 1 has one spring-loaded cord clap at every primary pocket opening 109, thereby providing individual security for each primary pocket 108 and the contents therein. In an exemplary embodiment, the spring-loaded cord clasp includes a cord 125, a button 126, and eyelets 127. When the spring-loaded cord clap button 126 is pressed and the cord 125 pulled through the eyelets 127, this permits the inside layer 111 of the primary pocket 108 to rest against at least a portion of the outer body of the fishing rods 124 using a compression or fiction fit, providing for a more secure hold of the fishing rods 124 within the primary pocket 108.

As best shown in FIG. 1, in one embodiment, each primary pocket 109 may support at least one accessory pocket 115. Also shown in FIG. 1, one or more accessory pockets 115 may define at one end an accessory pocket opening. Additionally, as shown in FIG. 1, the accessory pocket 115 can include a closure 116 to close the accessory pocket opening. In one embodiment, the closure 116 is at least one pad of an interlocking hook and a loop fabric such as Velcro®. Alternatively, the closure mechanism 116 can be other releasable fastening means such as spring-loaded cord clap, snaps, buckles, straps, or strings.

In one embodiment, the accessory pockets 115 include an inside layer 117 and outside layer 118 made of flexible fabric separated by a foam layer 119 creating an accessory pocket construction. The inside layer 117 and outside layer 119 may be sewn together to position the foam layer securely between them. The layers 117 and 118 may also be joined together using other means such as an adhesive, zipper, hook and loop, or other similar fasteners. The foam layer 119 may be made of a material that offers increased water-resistance, such as polyester.

In one embodiment, the accessory pocket 115 can be coupled to the outside layer 110 using various fastening techniques. In one embodiment, the accessory pocket 115 may be created by sewing the accessory pocket construction onto the outside layer 112 of the primary pocket 108. Alternatively, an accessory pocket 115 can be separately made and affixed to the outside layer 110 using an attachment method like Velcro®. The accessory pocket 115 can be manufactured in various sizes and may be attached to various locations of the carrier 100. In one embodiment, each accessory pocket 115 is made from nylon, and is sewn to the outside layer 110.

Figure 2:
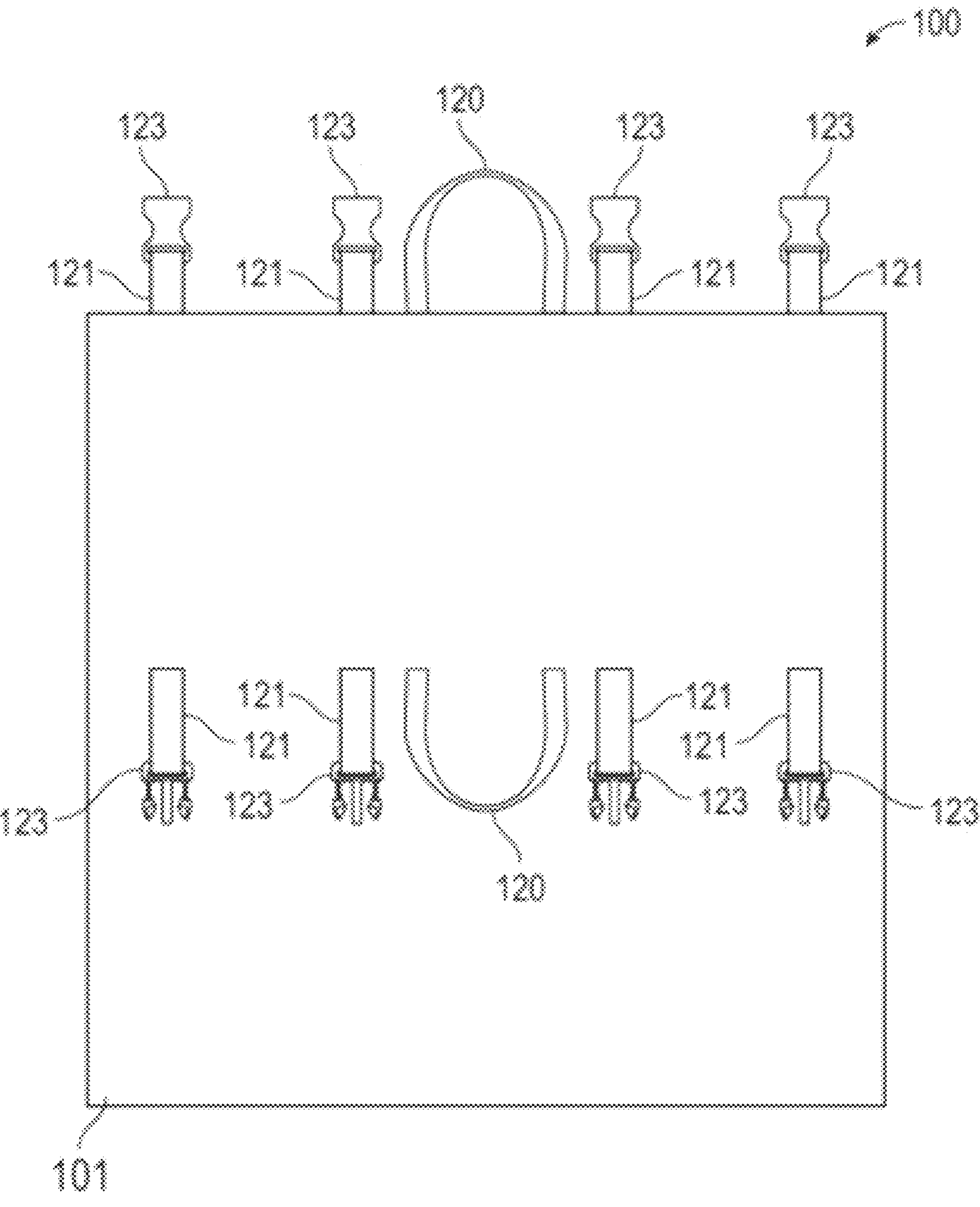
FIG. 2 shows a top view of the outside of the carrier in an unrolled position.
Figure 3:
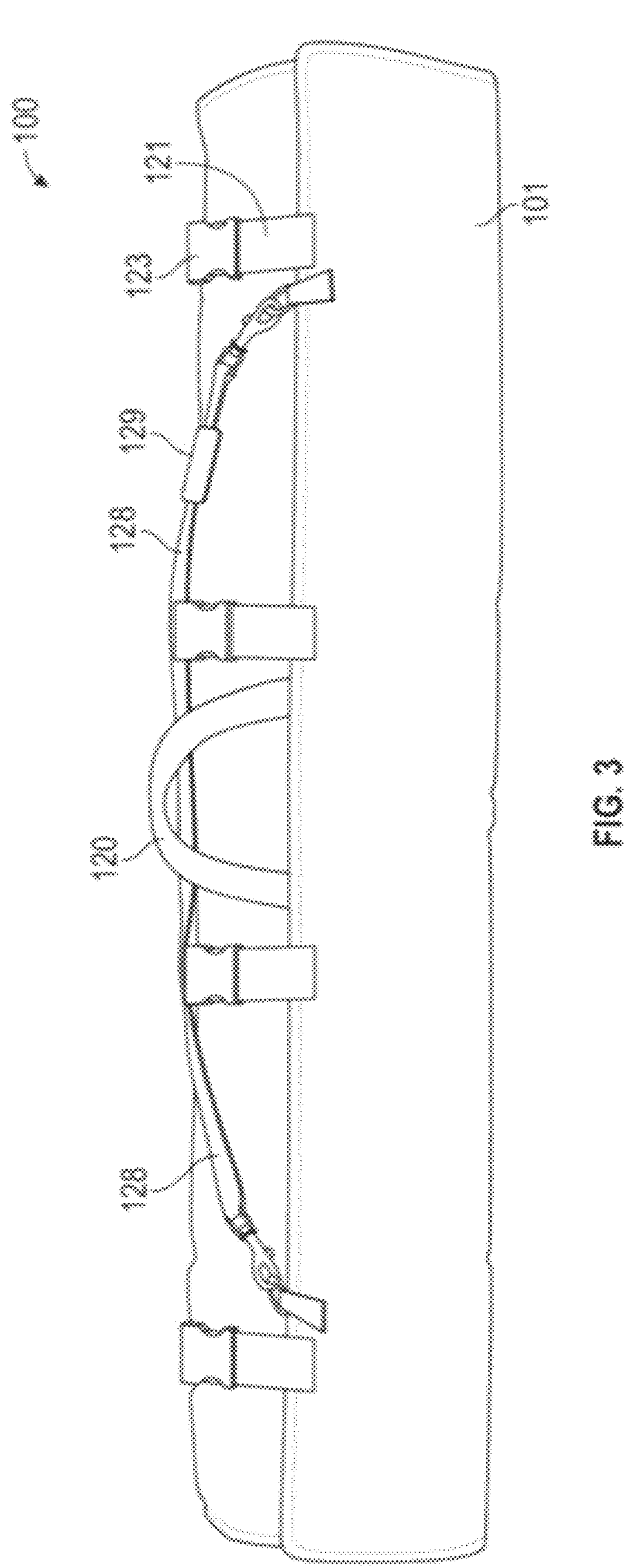
FIG. 3 shows a side-view of the carrier in a rolled-up position.

Referring to FIG. 2 and FIG. 3, the carrier 100 can include at least one carrying handle 120. The handle 120 is made by folding a strip of a flexible material to create a semi-circular shape. The flexible material can be durable materials such as fabric or leather. The handle 120 can be attached to the carrier 100 by stitching the ends of the handle 120 to the inside layer 103 and/or the outside layer 104. In one embodiment, the handle 120 extends from the top edge 102 of the panel 101. The handle 120 may vary in length. In one embodiment, a polypropylene shoulder-carrying strap 128 with a radius of 12.5" and a polypropylene hand-carrying strap 120 with a radius of 4.5", both straps being 2" wide, are supported by the outside layer 104. In one embodiment, as shown in FIG. 3, the shoulder-carrying strap 128 also supports a shoulder pad 129. As shown in FIG. 5, in one embodiment, that shoulder pad may include a foam layer 130 and outside layer 131 made of flexible fabric. In one embodiment, the foam layer is polyester foam which may provide increased water resistance for the carrier.

Referring to FIG. 3, FIG. 3 shows the carrier 100 in a rolled-up position. As best shown in FIG. 3, the carrier 100 contains at least one binding strap 121 attached to or supported by the outside layer 104 of the panel 101. When in use, once the carrier 100 has been rolled up, the binding strap 121 is utilized to keep the carrier 100 in the rolled-up position. The binding strap 121 can be further attached with quick-release buckles 123 or alternately a similar mechanism to secure the carrier 100 in a rolled-up position. Similar mechanisms include Velcro® pads. One embodiment contains two binding straps 121 sewn to the outside layer 104 of the panel 101, and each binding strap 121 is attached with one pair of quick-release buckles 123, enabling the carrier 100 to be locked in a rolled-up position.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and equivalents.

What is claimed is:

1. A rollable carrier for fishing rods with or without attached reels and accessories, the carrier comprising:

a flexible panel having an inside layer, an outside layer, a top edge, a first end portion, and a second end portion; and at least three primary pockets supported by the panel, each primary pocket having at least one primary pocket opening, a tapered V-shaped end opposite the pocket opening, an inside layer, an outside layer, and two elongated edges, wherein each of the two elongated edges of the at least three primary pockets are substantially the top edge in the flexible panel, and wherein each primary pocket is symmetrical along an axis parallel with the top edge.

2. The carrier of claim 1, wherein the panel is substantially rectangular in shape when in an unrolled position, wherein the panel can be manufactured to a size appropriate for carrying fishing rods with or without attached reels of having lengths less than, equal to, or greater than the length of each primary pocket.

3. The carrier of claim 1, wherein each primary pocket is located between the first end portion and the second end portion of the panel, and wherein the two elongated edges of each primary pocket are substantially the same length.

4. The carrier of claim 1, wherein each primary pocket can accommodate one or more fishing rods with or without attached reels.

5. The carrier of claim 1, wherein the primary pocket openings of a pair of adjacent primary pockets among the at least three primary pockets face opposite directions.

6. The carrier of claim 1, further including at least one carrying handle.

7. The carrier of claim 1, wherein the carrier includes a shoulder strap.

8. The carrier of claim 1, further including one or more foam layers, wherein at least one foam layer is located between the inside layers and the outside layers of the panel.

9. The carrier of claim 1, further including one or more foam layers, wherein at least one foam layer is located between the inside layers and the outside layers of the primary pockets.

10. The carrier of claim 1, further including a closure associated with at least one primary pocket.

11. The carrier of claim 10, wherein the closure is a spring-loaded cord-clamp.

12. The carrier of claim 1, further including one or more accessory pockets.

13. The carrier of claim 12, further including a closure associated with at least one accessory pocket of the one or more accessory pockets.

14. The carrier of claim 13, wherein the closure can be a releasable fastening means comprising hook and loop fabric, spring-loaded cord clamps, snaps, buckles, straps, or strings.

15. The carrier of claim 12, wherein the one or more accessory pockets include an inside and outside layer made of flexible fabric.

16. The carrier of claim 15, wherein the one or more accessory pockets contain at least one foam layer between the inside and outside layers.

17. The carrier of claim 1, further including at least one binding strap.

18. The carrier of claim 17, wherein the at least one binding strap comprises one or more quick-release buckles.

19. A rollable carrier for fishing rods with or without attached reels and accessories, the carrier comprising:

a flexible panel having an inside layer, an outside layer, a top edge, a first end portion, and a second end portion;

at least three primary pockets supported by the panel, each primary pocket having at least one primary pocket opening, wherein each primary pocket opening comprises a closure, a tapered V-shaped end opposite the pocket opening, an inside layer, and an outside layer, wherein each primary pocket can accommodate one or more fishing rods with or without attached reels, wherein each primary pocket and the closure of the at least one primary pocket opening are capable of accommodating fishing rods with or without attached reels of length greater than the length of each when each primary pocket is closed, and wherein each primary pocket is symmetrical along an axis parallel with the top edge.

20. The carrier of claim 19, further including one or more foam layers, wherein at least one foam layer is located between the inside layers and the outside layers of the panel.

* * * * *